INVENTOR.
John G. Osburn

June 4, 1968          J. G. OSBURN          3,386,543

MACHINE TOOL TRANSMISSION AND CONTROL MECHANISM

Filed Sept. 8, 1965                             4 Sheets-Sheet 2

*Fig. 2*

INVENTOR.
John G. Osburn
BY
Robert C. Jones
Attorney

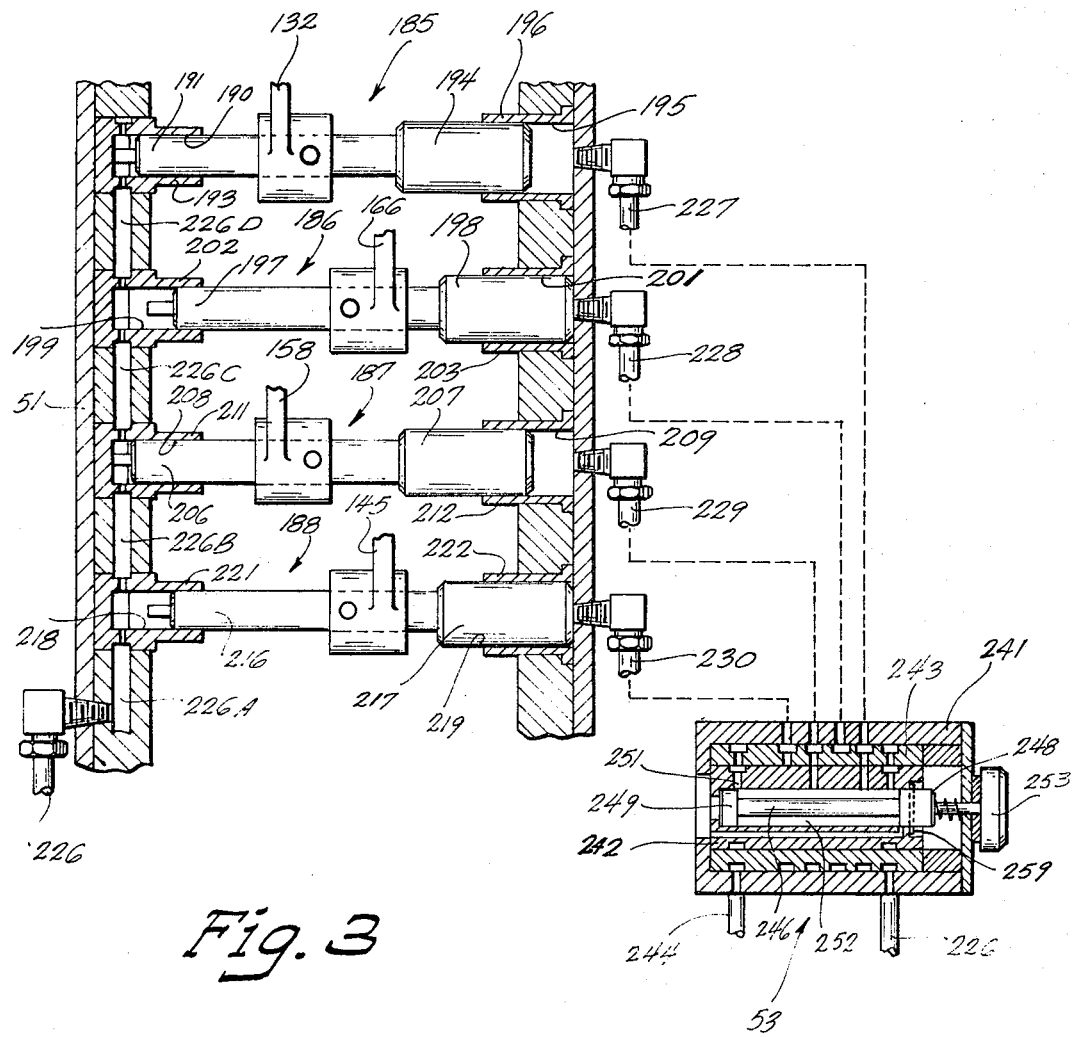

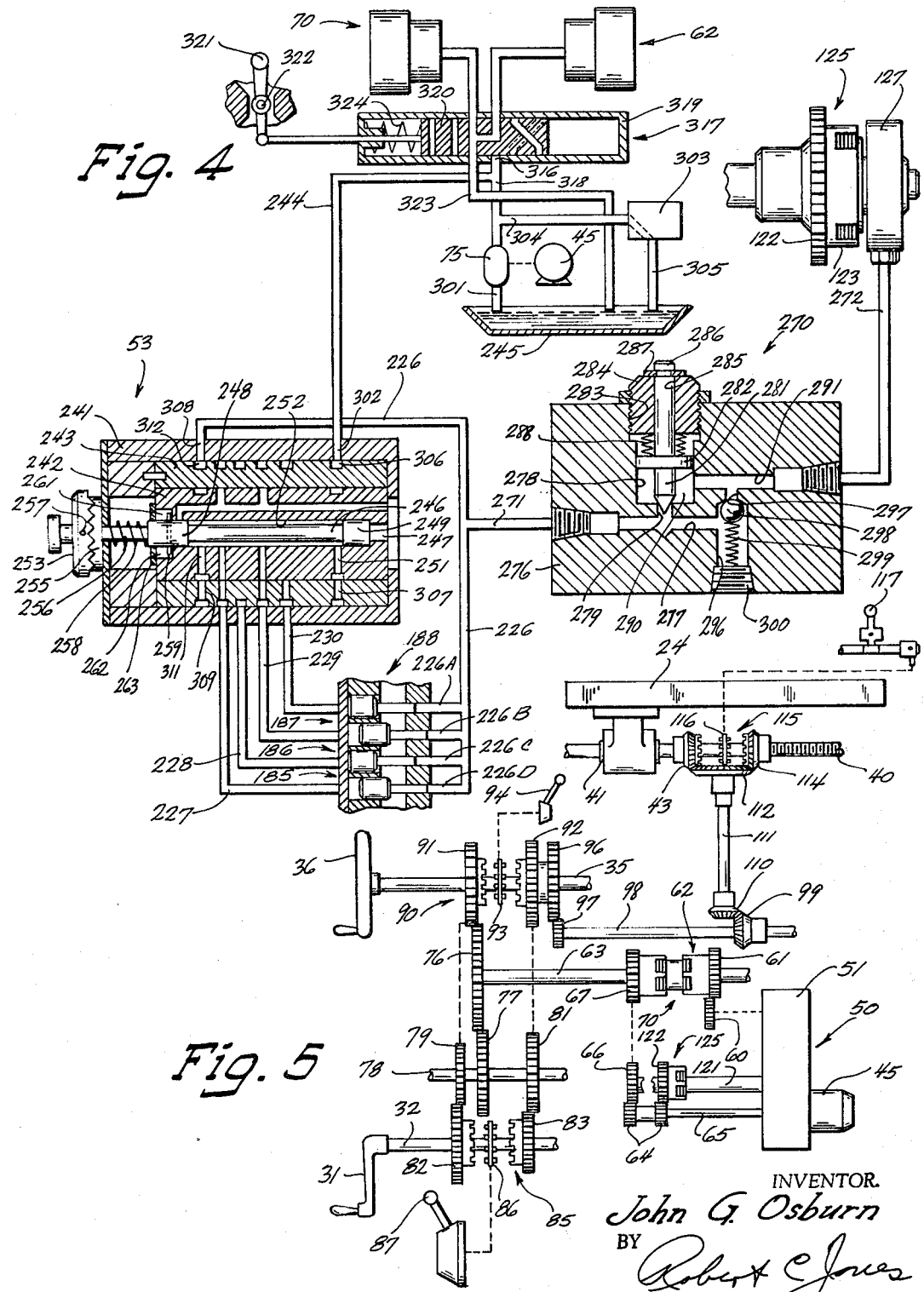

United States Patent Office

3,386,543
Patented June 4, 1968

3,386,543
MACHINE TOOL TRANSMISSION AND
CONTROL MECHANISM
John G. Osburn, Milwaukee, Wis., assignor to Kearney &
Trecker Corporation, West Allis, Wis., a corporation
of Wisconsin
Filed Sept. 8, 1965, Ser. No. 485,783
6 Claims. (Cl. 192—3.5)

ABSTRACT OF THE DISCLOSURE

Interposed between the feed drive motor and the gearing of a shiftable feed transmission is a hydraulic clutch which is normally operable to connect the feed motor to the input of the transmission. The transmission includes hydraulic shifters to effect selective shifting of the shiftable transmission gearing. A rotary feed selector valve is utilized to effect the desired actuation of the hydraulic shifters for obtaining the proper gear combination for a desired output feed rate of the transmissioin. Included in the hydraulic circuit is a time delay valve which is automatically operable to provide a slight lead time for the hydraulic shifters to complete their operation in effecting the proper gear shift combination prior to the hydraulic clutch being energized to connect the feed motor output to the input of the transmission. This insures that gear shifting will be fully completed prior to the motor output being connected to the transmission input.

---

This invention relates generally to machine tools and more particularly to a shiftably adjustable feed change transmission and control mechanism. therefor.

A general object of the invention is to provide an improved transmission and control mechanism for a power driven member of a machine tool.

Still another object of the present invention is to provide an improved transmission which incorporates automatic regulating means for facilitating gear shifting.

Yet another object of the present invention is to provide a shiftable gear transmission with an improved hydraulic control system which includes means for isolating the shifting gears of the transmission from the load of the drive and from the drive motor to thereby facilitate gear shifting.

Another object of the present invention is to provide an improved hydraulic control system for a shiftable gear feed transmission having means responsive to feed selection for momentarily interrupting the input drive between the drive motor and the transmission to facilitate gear shifting.

A still further object of the present invention is to provide a shiftable gear transmission having hydraulic gear shifting mechanism with a delay valve and a hydraulic clutch which operate automatically in response to gear selection to provide a time delay for operating the hydraulic gear shifters slightly ahead of the connecting drive clutch to facilitate gear shifting.

According to this invention, a machine tool having a shiftable gear feed transmission is provided with an improved hydraulic control mechanism adapted to selectively shift the transmission gears for effecting different transmission output feeds. Operatively interposed between the feed drive motor and the transmission is a hydraulic clutch member normally operable to connect the feed drive motor to the transmission for driving a movable member of the machine at a selected feed rate. The control mechanism for effecting selective gear shifting of the transmission includes hydraulically operated power actuators or gear shifters, a rotary feed selector valve and a time delay valve. The time delay valve is arranged in a manner to provide a slight lead time for effecting the operation of the gear shifters prior to the operation of the drive connecting clutch so that a gear shift pattern, which will provide the desired transmission output feed as selected by operation of the selector valve, is established before an input drive is imparted to the transmission. After expiration of the time delay, as established by the setting of the time delay valve, the valve is operable to direct fluid under pressure to the connecting drive clutch to effect its operation for connecting the feed drive motor to the transmission to thereby drive a movable machine member at the desired feed rate as selected through the operation of the selector valve.

The foregoing and other objects of this invention, which will become more fully apparent from the following detailed description, may be achieved by the exemplifying apparatus depicted and set forth in the specification in connection with the accompanying drawings.

FIG. 2 is a fragmentary developed view in side elevation showing the feed change transmission shown in FIGURE 1 with the gears being shown one above another for the purpose of clarity;

FIG. 3 is a fragmentary developed view in side elevation showing the power actuators and associated shifter forks that are operatively carried within the feed transmission frame;

FIG. 4 is a diagrammatic view of the hydraulic circuit; and,

FIG. 5 is a diagrammatic view showing the interrelationship of the mechanical operating parts of the power drives of the illustrated machine tool.

Figure 1:
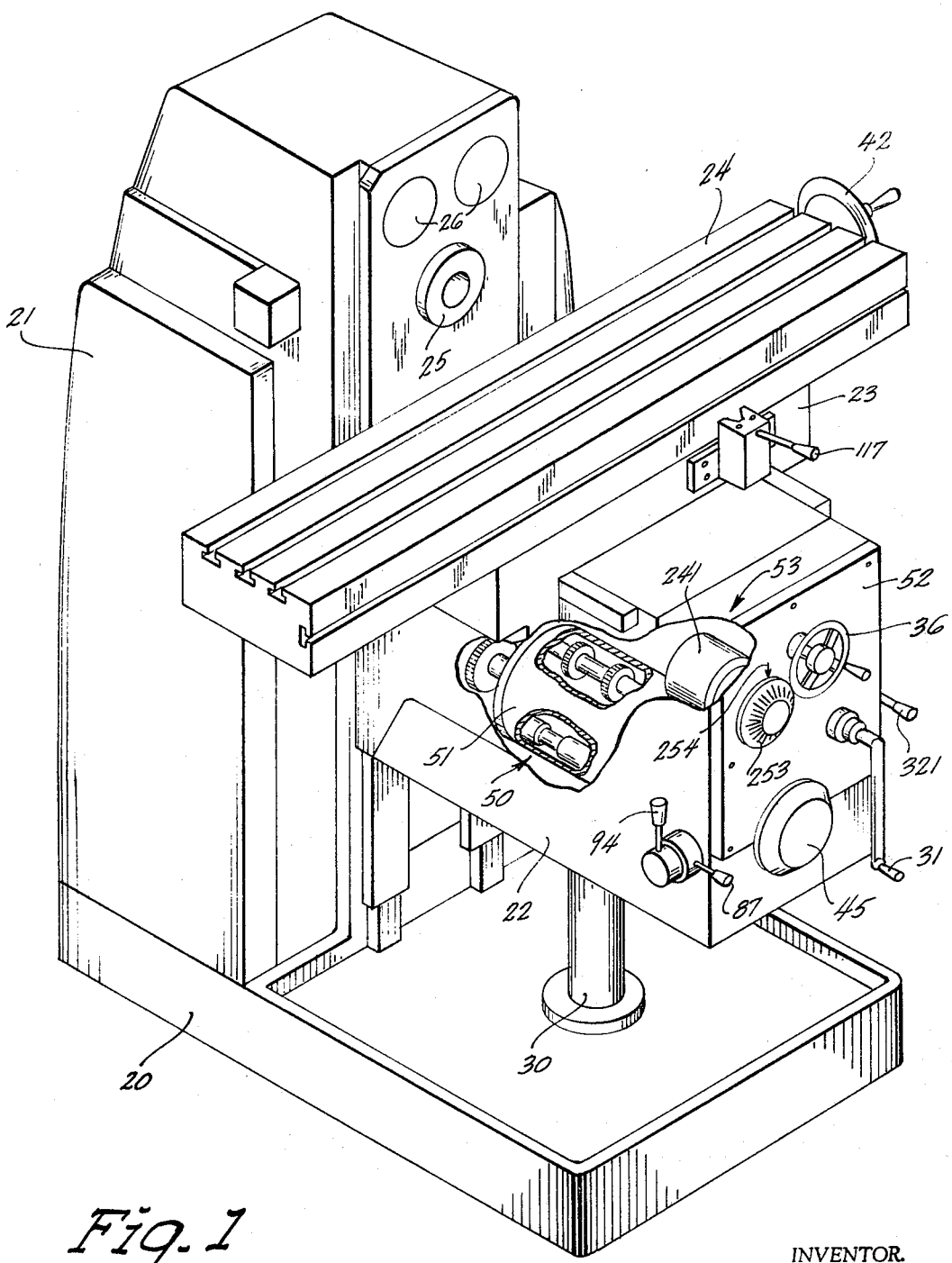
FIGURE 1 is a perspective view of a horizontal spindle milling machine in which the features of the present invention may be incorporated to advantage, a portion of the knee being broken away to show the feed transmission mechanism and feed selector valve.

Referring more particularly to the drawings and especially to FIGURE 1 thereof, the machine tool there shown is an example of apparatus in which the features of the present invention may be incorporated to good advantage. As shown in FIGURE 1, the milling machine is a horizontal spindle type machine. The machine structure comprises essentially a base 20 having an upstanding column 21 which serves to carry on its face a knee 22, a saddle 23, and a work supporting table 24, superimposed for selective sliadble movement in a plurality of mutually transverses planes. Near the top of the column 21 there is journaled the usual horizontal disposed tool operating spindle 25. Extending outwardly from the front face of the column 21 above the spindle 25 are slidably mounted overarms 26 for supporting an arbor support (not shown) that may be mounted in the spindle 25 in well-known manner.

Vertical movement of the knee 22 is effected by means of an elevating screw 30 having one end secured in the base 20 and having its opposite end secured in the knee 22. The screw 30 is disposed in cooperative engagement with a rotatable nut (not shown) journaled in the knee. Manual rotation of the knee elevating nut (not shown) is effected by means of a crank 31, engageable on the extending end of a shaft 32, FIG. 5, that is journaled in the knee and operably connected to effect rotation of the nut (not shown) in well-known manner.

Movement of the saddle 23 in its path of travel is accomplished by means of an axially stationary screw 35, FIG. 5, that is rotatably supported in the knee 22. The screw 35 is cooperatively engaged with a non-rotatable nut (not shown) carried by the saddle 23. Manual movement of the saddle is effected by operation of a handwheel 36 carried on the extending end of the screw 35.

Horizontal movement of the table 24 in its path travel is effected by operation of a rotatable axially stationary screw 40, FIG. 5, that is cooperatively engaged with a fixed nut 41 carried in a bracket secured to the underside of the table 24. A handwheel 42 is desengageably carried on the extending end of the screw for effecting manual movement of the table.

Power for rotating the tool spindle 25 at a plurality of speeds is obtained from an adjustable speed transmission (not shown) which, in turn, is driven by a motor (not shown), both of which are operatively disposed within the column 21.

Movement of the knee, saddle and table in their respective paths of travel is effected by power derived from a motor 45 operatively disposed with the knee 22. The motor 45, secured to a frame 51 of a hydraulically shiftable variable feed transmission 50, is also disposed within the knee 22.

The feed transmission 50 comprises a plurality of nonshiftable gears and a plurality of cooperable shiftable gears. The shiftable gears are arranged in couplets with each couplet comprising two gears. Each gear couplet has only two adjustable positions to which it may be shifted so that one of the gears of each couplet is continuously engaged with another gear of the transmission. Each gear couplet is shifted to one of its two positions by an associated hydraulic power actuator. The feed transmission 50, as well as the hydraulic power actuators or shifters, are carried in the frame 51 that is secured to a distribution box 52 fastened to the front of the knee 22. The distribution box 52 also serves as a cover for closing the front opening in the knee.

As previously mentioned, the feed transmission 50 is selectively operable to drive the movable members at a selected one of a plurality of feed rate outputs. Operation of the feed transmission 50, to effect a desired feed rate output, is under the control of a rotary feed selector control valve 53 that is also carried by the distribution box 52 and disposed to extend inwardly into the knee 22.

The feed transmission 50 drives an output gear 60, FIGS. 2 and 5, which is disposed in meshing engagement with a gear 61 that is secured to a sleeve portion of a hydraulically actuatable feed clutch 62. The sleeve portion of the clutch is supported for independent rotation on a power transfer shaft 63 that is journaled in the knee 22. The clutch 62, which may be of any readily available commercial type, also has a body portion which is secured to the shaft 63. Thus, energization of the clutch 62 will operate to couple the feed transmission 50 to the power transfer shaft 63 so that it will be driven at a selected feed rate.

On the other hand, the movable members may also be moved at a rapid transverse rate. The rapid tranverse drive is obtained directly from a motor pinion 64, which is diagrammatically illustrated in FIG. 5 as being elongated, but which is shown in FIG. 2 in its normal construction. The pinion 64 is secured for rotation on the outer end of a motor output shaft 65 which is journaled in the feed transmission frame. A transfer gear 66 is disposed in meshing engagement with the pinion 64 and is also arranged to be in meshing engagement with an independently rotatable gear 67 associated with a hydraulically actuatable rapid traverse clutch 70. The transfer gear 66 is shown in FIG. 2 secured to a shaft that is rotatably journaled in a bracket 71 secured to the side of the transmission frame 51. The transfer gear 66, in addition to transferring the rapid traverse drive from the pinion 64 to the rapid traverse gear 67, is also utilized to drive the hydraulic pump 75, shown schematically in FIG. 4. The rapid traverse clutch 70 is similar to the feed clutch 62 and has a sleeve portion, on which the gear 67 is secured, supported for independent rotation on the transfer shaft 63 while the body portion of the clutch is secured to the shaft 63. Thus, selective energization of either the feed clutch or the rapid traverse clutch 70 will drive the power transfer shaft 63 at a selected feed rate or at a rapid traverse rate.

The power transfer shaft 63 has a power take off gear 76 fixedly secured thereto. Gear 76 is disposed in driving engagement with a gear 77 that is fixedly secured to a countershaft 78 also journaled in the knee 22. Rotational drive to a countershaft 78 will effect rotation of a gear 81 that is fixedly secured on the countershaft for rotation therewith. On the other hand, gear 79 is supported on the shaft 78 for independent rotation. The gears 79 and 81 are meshingly engaged with a pair of gears 82 and 83, respectively, which are a part of a directional clutch 85 for effecting vertical movement of the knee 22 in either direction. The gears 82 and 83 are supported in spaced relationship for independent rotation on the shaft 32 and are provided on adjacent faces with clutch teeth. A clutch sleeve 86, having clutch teeth on each axial end, is splined on the shaft 32 between the gears 82 and 83 and is axially movable in opposite directions from a central neutral position to alternate positions of engagement with gear 82 or with gear 83. Selective movement of the clutch sleeve 86 is accomplished by means of a manual lever 87 that is mounted for pivotal movement on the side of the knee 22, as shown in FIGURE 1.

A directional reversing control clutch 90 is provided for effecting movement of the saddle 23 in its path of travel in either direction. The clutch 90 comprises a pair of gears 91 and 92 that are supported on the screw 35 for independent rotation. The gears 91 and 92 are provided with clutch teeth which are formed on adjacent faces of the gears 91 and 92. A clutch sleeve 93, having clutch teeth on each end thereof, is splined on the screw 35 between the gears 91 and 92 and is movable selectively in opposite directions from a central neutral position into selective engagement with either the gear 91 or gear 92. Selective axial movement of the clutch sleeve 93 is effected manually by means of a connected lever 94 also pivotally supported on the knee 22, as shown in FIGURE 1. The clutch gear 91 is disposed in meshing engagement with the power take off gear 76 to be driven thereby. On the other hand, the companion clutch gear 92 is driven from the countershaft gear 81. Thus, the knee 22 and saddle 23 may be selectively moved in their paths of travel in either direction at a selected feed rate or at a rapid traverse rate.

Power for translating the table 24 is obtained from a gear 96 that is mounted on the screw 35 for rotation relative to the screw. The gear 96 is secured to the clutch gear 92 to be driven thereby and is disposed in meshing engagement with a gear 97 fixed on a shaft 98 that is journaled in the saddle 23. A bevel gear 99 secured for rotation with the shaft is disposed in driving engagement with a complementary bevel gear 110 secured on a power shaft 111. Integrally formed on the opposite end of the shaft 111 is a bevel gear 112 that is disposed in meshing engagement with a pair of bevel gears 113 and 114 of a table direction clutch 115. The bevel gears 113 and 114 are supported in spaced relationship on the screw 40 for independent rotation relative to the screw and are provided with clutch teeth on adjacent hub faces. A shiftable sleeve 116, having clutch teeth on each end, is splined on the screw 40 between the gears 113 and 114 and is movable in opposite directions from a central neutral position into selective engagement with one or the other of the bevel gears. Selective shifting of the clutch sleeve 116 to obtain a desired direction of table travel at a selected feed rate or at a rapid traverse rate is effected by actuating a connected shift lever 117.

As previously mentioned, the feed transmission comprises a plurality of non-shiftable gears and a plurality of shiftable gears. The shiftable gears are arranged as couplets with each couplet comprising two gears. Each gear couplet has two positions, with each position being a drive position. Shifting of each couplet from a normal drive position to a shifted drive position is accomplished by individual hydraulc shifters or actuators operatively carried in the frame 51. As shown in FIG. 2, the feed transmission has an input shaft 121 that is rotatably journaled in the frame 51. Power for rotating the input shaft 121 is obtained from the pinion 64, FIGS. 2 and 5, that is keyed to the outer extending end of the shaft 65, as shown in FIG. 2. The pinion 64 is adapted to be in meshing engagement with a gear 122 formed on a clutch sleeve 123 of a hydraulically operated drive connecting clutch 125. The sleeve 123 is mounted on the extending end of the input shaft 121 being supported on an antifriction bearing 126 for independent rotation relative to the shaft. A clutch body 127 is secured to the extreme outer end of the input shaft 121 in a manner to drive the shaft. Energization of the clutch 125 serves to effect a coupling drive connection between the sleeve portion 123 and the clutch body 127. In this manner, the rotational drive imparted to the gear 122 from the pinion 64 will be transmitted to the clutch body 127. Since the clutch body 127 is drivingly secured to the shaft 121, the drive from the motor 45 will be transmitted to the input shaft 121 of the feed transmission 50.

A gear couplet 131 is disposed in splined engagement on the input shaft 121 for axial movement thereon. The gear couplet 131 is provided with the usual annular groove for receiving a shifter fork 132 which is operative to effect shifting movement of the couplet into driving engagement with either a gear 133 or a gear 134. The gears 133 and 134 are non-shiftable gears and are splined on a first shaft 136 that is rotatably supported in the frame 51. A gear 137 of the couplet 131 is shown in meshing engagement with the fixed gear 133 but the couplet 131 may be shifted rightwardly to mesh a companion gear 138 with the fixed gear 134. Rotational drive from the couplet 131 is transmitted via either the gear 133 or 134 to the shaft 136 and thence via a fixed gear 139 to a gear 141 of a gear couplet 142. The gear couplet 142, comprising the gear 141 and a companion gear 143, is axially movable on a second shaft 144 that is also rotatably supported in the frame 51. Axial shifting movement of the couplet 142 is accomplished through the operation of a shifter fork 145 engaged in an annular groove formed between the gears of the couplet.

Axial leftward movement of the couplet 142, from the position it occupies in FIG. 2 to its second shift position, will operate to engage the gear 143 of the couplet with the gear 134. Thus, the shaft 144 will be rotatably driven either from the gear 139 via the gear 141, or from the gear 134 via the gear 143. Fixed on the shaft 144 for rotation therewith are non-shiftable gears 151 and 152. The gear 152 is shown in meshing engagement with a gear 153 of a shiftable gear couplet 154 splined on a shaft 156 rotatably supported in the frame 51. The couplet 154, comprising the gear 153 and a companion gear 157, is shiftable from the position it occupies in FIG. 2 to its other engaged position in which the gear 157 will be in driving engagement with the gear 151. Axial shifting movement of the couplet 154 is effected by operation of a shifter fork 158 engaged in the usual annular groove formed on the couplet.

The rotatably driven shaft 156 is provided with a non-shiftable gear 161 that is secured to the shaft for rotation with it. The gear 161 is adapted to be engaged by a gear 162 of an axially shiftable gear couplet 163 splined on a shaft 164 rotatably supported in the frame 51. The shifting movement of the couplet 163 is effected by operation of a shifter fork 166 engaged in an annular groove formed on the couplet. The rotational drive transmitted to the shaft 164 via gears 161 and 162 will, in turn, be transmitted to the output shaft 167 of the transmission. This is effected by operation of a non-shiftable gear 168 that is splined on the shaft 164 and is adapted to be in constant meshing engagement with a gear 169. The gear 169 is splined in axially fixed position on the output shaft 167 on which the feed transmission output gear 60 is also secured for rotation therewith.

The output of the feed transmission 50 is further variable through the operation of back gearing and which constitutes a range change. This drive is established from the shaft 156 which, at its rightward end, is provided with an integral gear 171 formed thereon. The gear 171 is disposed in constant meshing engagement with one gear 172 of a non-shiftable gear cluster 173 that is supported on the shaft 144 for independent rotation thereon. A companion gear 176 of the couplet 173 is disposed in constant meshing engagement with a gear 177 of another non-shiftable gear cluster 178 mounted for independent rotation on the shaft 156. A companion gear 179 of the couplet 178 is adapted to be meshingly engaged by a companion gear 181 of the gear couplet 163 when the couplet is in its rightward shift position, as shown in FIG. 2.

With this arrangement and with the couplet 163 in the position shown in FIG. 2, the shaft 164 will be driven at a selected one of a plurality of speeds in one range. This drive is completed from the shaft 156 via the gear 171, which is in meshing engagement with the gear 172 of the non-shiftable couplet 173. Since the couplet 173 is supported on the shaft 144 for independent rotation relative to the shaft 144, its rotation does not interfere with the rotation of the shaft 144. The companion gear 176 is disposed in meshing engagement with the gear 177 of the non-shiftable couplet 178. Thus, the rotational drive imparted to the gear 172 is transmitted to the couplet 178 via gears 176 and 177. As previously mentioned, the non-shiftable couplet 178 is supported for independent rotation on the shaft 156 and its independent rotation does not affect the rotation of the shaft 156. The companion gear 179 of the rotatably driven couplet 178 is in meshing engagement with the gear 181 of the shiftable couplet 163. On the other hand, with the couplet 163 shifted into a leftward position so that its gear 162 is in meshing engagement with the fixed gear 161, the shaft 164 will be driven at a selected one of a plurality of different speeds in a second range.

The hydraulically operated actuators for effecting the shifting of the shiftable gear couples 131, 142, 154 and 163 of the feed transmission 50 is shown in the diagrammatic developed view of the transmission in FIG. 3 and also in the perspective view of FIGURE 1.

As illustrated in FIG. 3, the shifting device has hydraulically operated power actuators or shifters 185, 186, 187 and 188. The actuators 185 to 188, inclusive, each carry an associated shifter fork 132, 166, 158 and 145, respectively, which are secured thereto for movement with the actuators. As shown, the actuator 185 has a small diameter piston 191 that moves in a cylinder 190 formed in a body portion 193 that is carried in an end wall of the transmission frame 51. Similarly, the opposite end of the actuator 185 is provided with a large diameter piston 194 movable in a cylinder 195 carried in the opposite end wall of the frame 51. In like manner, the ends of the actuator 186 has a small diameter piston 197 and a large diameter piston 198 each of which is movable in a cylinder 199 and 201, respectively, formed in bodies 202 and 203 that are carried by the frame 51. The actuator 187 is provided with a small diameter piston 206 and a large diameter piston 207 that are respectively movable in cylinders 208 and 209 formed in bodies 211 and 212, respectively. The same arrangement is provided for the actuator 188 and it has a small diameter piston 216 and a large diameter piston 217, respectively, slidable in cylinders 218 and 219 formed in cylinder bodies 221 and 222 that are carried by the frame 51.

The actuators 185, 186, 187 and 188 are constantly urged into a rightwardly shifted position by hydraulic pressure fluid acting on the ends of the small diameter pistons 191, 197, 206 and 216 respectively. The pressure fluid is supplied to the cylinders 190, 199, 208 and 218 simultaneously via a common supply line 226 connected between the selector control valve 53 and the transmission.

The pressure fluid from the supply line 226 flows into a passage 226A and thence into the cylinder 218 and by means of communicating passages 226B, 226C and 226D into cylinders 208, 202 and 192 respectively. On the other hand, the cylinder 195, in which the large diameter piston of the actuator 185 is disposed, is supplied with pressure fluid by a line 227, which is also connected to the selector control valve 53. In a similar manner, the cylinders 201, 209 and 219 are each supplied with pressure fluid by individual lines 228, 229 and 230 respectively, which are also connected to the selector valve 53. Thus, the cylinders associated with the small diameter pistons of the several actuators are all supplied with pressure fluid simultaneously while the cylinders associated with the large diameter pistons of the actuators are selectively supplied with pressure fluid from individual lines.

As previously mentioned, the shiftable gear couplets 131, 142, 154 and 163 in the feed transmission 50 are shifted to either of two shiftable adjusted drive positions by operation of the connected shifter forks 132, 145, 158 and 166 respectively, which in turn, are moved in either direction by the selective operation of the associated actuator 185, 188, 187 and 186 respectively. Selective operation of the power actuators for effecting gear shifting in the transmission is under the control of the rotary feed selector control valve 53. The rotary selector valve 53 is operable to direct pressure fluid to the plurality of connected fluid lines which, in turn, are connected to the power actuators. A detailed description of the valve 53 is not deemed to be necessary for an understanding of the present invention, and if necessary, reference may be had to a corresponding U.S. patent application of John G. Osburn, Ser. No. 32,436, now U.S. Patent 3,176,529 in which a detailed description of a similar valve is set forth. Generally, the selector valve 53 compries a valve body 241 which is carried in the distribution box 52, as shown in FIGURE 1. A stationary sleeve 243, having a plurality of annular grooves and radial passages formed therein is disposed in predetermined relationship in the valve body 241. A selector sleeve 242 is rotatably supported in the stationary sleeve 243 and has a plurality of radial openings which are selectively positionable into registration with predetermined radial passages in the stationary sleeve 243. Selective rotation of the selector sleeve 242 operates to place predetermined openings in the sleeve in registry with certain openings or radial passages in the stationary sleeve 243. Thus, pressure fluid supplied to the control valve 53 from the pump 75 via a connecting supply line 244 will be directed to a selected shifter actuator or to a selected combination of a plurality of actuators to effect an adjustment of the feed transmission 50 for obtaining a required output for moving a movable member, such as the table 24, at a desired feed rate.

A flow control plunger 246 is slidably carried in a bore 247 provided in the rotatable sleeve 242 and is movable axially outwardly relative to the sleeve for the purpose of blocking the flow of pressure fluid to the common supply line 226 which supplies fluid simultaneously to all the small diameter pistons of the actuators and to the individual large diameter piston supply lines 227 to 230, inclusive. This is done to prevent the continuous shifting movements of the gear couplets 131, 142, 154 and 163 during the interval that the valve sleeve 242 is rotated to a new position for the purpose of establishing a different feed rate. To effect an interruption in the flow of pressure fluid through the control valve 53, the plunger 246 is provided with large diameter end portions 248 and 249. With the plunger 246 moved axially leftwardly from its position in FIG. 4, the large diameter right end 249 of the plunger will be moved to the left into position to block a pressure fluid inlet radial passage 251 formed in the rotary sleeve 242. Thus, pressure fluid supplied to the valve 53 via the supply line 244 cannot enter a valve supply chamber 252 defined by the plunger ends 248 and 249 and the bore 247. By operation of the valve 53, pressure fluid in the chamber 252 will normally flow to all the cylinders associated with the small diameter pistons 191, 197, 206 and 216 simultaneously; and also to selective ones of the cylinders associated with the large diameter pistons 194, 198, 207 and 217 of the shifter actuators 185, 186, 187 and 188, depending upon the particular setting of the valve. However, with the plunger 246 moved axially leftwardlly, the end 249 effectively blocks pressure fluid from entering chamber 252, and the actuators will be maintained in their last shifted position, and gear shifting will not occur. This is true because in any one of a plurality of feed selected positions to which the rotary valve sleeve 242 may be rotated, pressure fluid is always supplied simultaneously to the cylinders 190, 199, 208 and 218 associated with the small diameter pistons 191, 197, 206 and 216 of the actuators 185, 186, 187 and 188. Thus, in any feed select position, the actuators are always urged to the left as viewed in FIG. 4, or to the right as viewed in FIG. 3. However, in each feed select position of the valve, only a selected one or a selected combination of the cylinders 195, 201, 209 and 219, respectively, of the actuators are connected to receive pressure fluid to establish a desired gear shift pattern so that the transmission will operate to drive the movable member at the desired feed rate. For example, with the rotary sleeve 242 of the valve 53 positioned as depicted in FIGS. 3 and 4, pressure fluid is directed simultaneously to the cylinders 190, 199, 206 and 218 so that the pressure acts upon the relatively small area of the smaller diameter pistons of the actuators 185 to 188, inclusive. This will tend to urge all of the actuators into their rightwardly located positions as viewed in FIG. 3, or into their leftwardly located positions as viewed in FIG. 4, as exemplified by the position of the actuators 186 and 188. However, with the assumed depicted setting of the valve 53, pressure fluid from the chamber 252 is also directed to the cylinder 195 associated with the larger diameter piston 194 of the actuator 185. Since the end area of the piston 194 on which the pressure fluid will act is greater than the end area of the small piston 191, the force acting on the end of the large diameter piston is greater than the force acting on the end of the small diameter piston, and as a result, the actuator 185 will be moved leftwardly as depicted in FIG. 3, or rightwardly as depicted in FIG. 4. The same is also true for the actuator 187, and it too will be moved to the position depicted in FIGS. 3 and 4. With the particular depicted setting of the valve 53, no pressure fluid is supplied to the ends of the large diameter pistons 198 and 217 of the actuators 186 and 188 respectively. As a result, they will not be moved but will remain in their normal biased position as shown. Now, assuming that it is desired to effect movement of the table 24 at a feed rate, which is different from that which is established through the depicted setting of the valve 53, the plunger 246 will be moved axially to the left, as viewed in FIG. 4. This movement of the plunger 246 moves the large end 249 of the plunger 246 into position to block the flow of pressure fluid to the valve distribution chamber 252. As a result, the flow of pressure fluid to the cylinders of the small diameter pistons of the actuators 185 to 188 is interrupted. Likewise, the pressure fluid flowing to the cylinders 195 and 209 associated with the large diameter pistons 194 and 207 of the actuators 185 and 187 respectively, is also interrupted. Therefore, there is no force acting on either end of the actuators 185 and 187 and they will remain in the depicted position; in like manner, the actuators 186 and 188 will also remain in their depicted positions. This effectively prevents continuous shifting of the movable gear couplets of the transmission during the interval that it takes to rotate the valve to different desired output selecting positions. As soon as the valve has been moved to a desired position and the plunger 246 returned to normal inward position, pressure fluid will immediately be directed to the ends of the small diameter pistons of all of the actuators 185 to 188, and to the ends of predetermined ones of the larger diameter pistons of the actuators. Operation of one or more of the power actuators 185 to 188 will immediately occur to move predetermined gear couplets to establish a gear shift pattern for obtaining the desired transmission output.

Selective operation of the valve 53 in a feed rate selecting position operation is manually accomplished by rotating a dial 253 having indicia corresponding to the various feed rate outputs of the transmission and which cooperates with a mark 254, FIGURE 1. Before the dial may be rotated it must be moved axially outwardly to the left, as viewed in FIG. 4, to disengage axially extending serrations from cooperating serrations formed on a fixed locking ring 255. Since outward movement of the dial 253 is a prerequisite to the rotational selecting movement thereof, advantage has been taken of this requirement to effect the axial outward movement of the plunger 246. To this purpose the plunger 246 is provided with a reduced leftwardly extending portion 256 which extends outwardly of the valve and which receives the dial 253. The dial 253 is secured to the outwardly extending end of the shaft 256 in any well-known manner as by means of a pin 257. Thus, when the dial 253 is pulled to the left to disengage it from the locking ring 255, the plunger 246 will also be moved axially to the left into position to block the flow of pressure fluid into the chamber 252. A coil spring 258 is mounted about the reduced portion 256 and is operatively disposed to urge the plunger 246 into its normal inward position or to the right as viewed in FIG. 4.

Rotation movement of the manual dial 253 in a feed selecting movement is transmitted to the sleeve 242 for effecting a corresponding rotation thereof into a position for effecting a distribution of pressure fluid to selected ones of the actuators 185 to 188, inclusive, for establishing a gear shift pattern for obtaining the desired indicated transmission feed rate output. To this end, a pin 259 is carried in the enlarged left end portion 248 of the plunger 246. The radially extending ends of the pin 259 are disposed within radial slots 261 and 262 formed in the left end of the rotatable sleeve 242. The axial depth of the slots 261 and 262 is sufficient to permit the axial outward movement of the plunger 246 a distance sufficient to allow the dial 253 to disengage from the locking ring 255 and the large end portion 249 of the plunger 246 to move into registry with the radial passage 251. Leftward axial movement of the plunger 246 is limited by means of a stop ring 263 secured to the axial end face of the rotatable sleeve 242. Thus, with the dial in leftward or outward disengaged position, rotation of the dial will effect like rotation of the plunger 246. The pin 259 carried by the plunger 246 and disposed in operative engagement in the slots 261 and 262 of the rotary sleeve 242 will operate to effect rotation of the sleeve. With the dial rotated to a desired feed rate selecting position, as indicated by the selected indicia on the dial registering with the mark 254, the rotary sleeve 242 will also have been angularly positioned so as to effect a distribution of pressure fluid to selected combination of the actuators 185 to 188, inclusive, to establish a gear shift pattern for obtaining the desired transmission output upon the return of the plunger 246 to its normal inward position. With a setting established, the dial 253 is released and the spring 258 will urge the plunger 246 inwardly or rightwardly to the position depicted in FIG. 4. Thereupon pressure fluid will again flow into the chamber 252 and be distributed simultaneously to the small diameter pistons and to a predetermined combination of the large diameter pistons of the actuators 185 to 188, inclusive, in accordance with the rotary setting of the sleeve 242.

In the feed transmission 53, the movable gear couplets 131, 142, 154 and 163 are each shifted between two drive positions, there being no neutral position provided for the couplets. With the particular arrangement, the motor 45 is continuously operating and driving the transmission, and as a result, the shiftable gear couplets are continuously driven. Therefore, in order to effect a shifting movement of the gear couplets, they must be moved laterally at the same time thta they are in tight driving engagement with a non-shiftable gear of the transmission. Thus, when a gear couplet is shifted, a certain amount of sliding friction is generated between the meshed teeth of a gear couplet and a non-shiftable gear. This causes a gradual abrasion of the contacting faces of the gear teeth. However, a more serious effect that is experienced in the shifting of gears of a continuously driven transmission is a clashing of the gears when shifting into meshing engagement. Also, when a non-rotating gear is moved laterally against a positively driven gear having a relatively high peripheral speed, a shock load is imposed upon the gear train when a meshing engagement of gears is effected. This is particularly true when a gear change is made to go from a relatively low drive rate to a relatively high rate, e.g., from 5 inches per minute to 90 inches per minute. It has also been found that when effecting a shifting movement a complete shift will not always occur because the gears may "hang-up" or frictionally engage face-to-face.

The above-mentioned conditions are avoided in the transmission 50 by providing a relatively simple but extremely effective means to control the drive input to the transmission during a feed rate selection operation. To this end, a pressure fluid control valve 270, shown schematically in FIG. 4, is connected to receive pressure fluid from the common supply line 226 via a connecting line 271. The pressure fluid to the valve 270 will flow through the valve and into a connected line 272. The opposite end of the line 272 is connected to the relatively fixed body 127 of the clutch 125. Pressure fluid supplied to the clutch 125 will effect the operation of the clutch to couple the body portion 127 to the gear sleeve portion 123. As previously mentioned, the body portion 127 of the clutch 125 is keyed or otherwise coupled to the input shaft 121. On the other hand, the sleeve portion 123 and the gear 122, which is secured to the sleeve portion, are supported on the input shaft 121 for rotation relative to the shaft on the antifriction bearing 126. Therefore, when the sleeve portion 123 and the body portion 127 are coupled together, the input drive from the motor 45 will be transmitted to the transmission input shaft 121.

Since the pressure fluid for energizing the drive coupling clutch 125 is supplied to the clutch from the common supply line 226, the flow of fluid to the clutch 125 will be interrupted at the same time that the flow of pressure fluid is interrupted to the shifter actuators 185 to 188, inclusive. With the flow of pressure fluid to the clutch interrupted, the drive connection established between the sleeve portion 123 and the body 127 of the clutch will be released. As a result, the drive input from the motor 45 to the gear 122 of the sleeve 123 will only rotate the gear in an idling movement on the shaft 121. After a different feed rate has been selected and the dial 253 released to again reconnect the valve chamber 252 to the valve inlet passage 251, pressure fluid will again flow in the common supply line 226. The pressure fluid will be distributed to predetermined ones of the actuators 185 to 188, inclusive, to effect the operation of the required actuators for establishing a gear shift pattern for obtaining the desired transmission output. With pressure fluid once again flowing in the common supply line 226, it will also flow into the line 271 for energizing the coupling clutch 125. However, at this time, the operation of the clutch 125 is delayed slightly to enable the actuators 185 to 188, inclusive, to operate in a gear shift operation before the clutch 125 is rendered operable to transmit the input drive to the transmission.

With this arrangement, since the drive to the shaft 121 is interrupted, all the gears in the transmission 50 are stationary at the time of gear shifting and there is no load on the gears. As a result, the tight frictional engagement between the teeth of a non-shiftable gear and a shiftable gear is relieved. This means that a later shifting of a suitable gear may be easily accomplished without undue force and without causing undue wear on the contact faces of gears. Moreover, as a shiftable gear is moved into position of meshing engagement with a non-shiftable gear, such engagement is smoothly accomplished with no clashing of gears. Thus, the transmission gear train is not subjected to a shock load at any time. On occasions, meshing engagement between a shiftable gear and a non-shiftable gear will not occur because of misalignment of the respective gear teeth. However, this does not present difficulties, because when the input drive from the motor 45 to the transmission is again reestablished, the initial rotational movement of either the non-shiftable gear or the shiftable gear will serve to effect the meshing engagement of the gear teeth. Since the shiftable gear is being constantly urged to full shift position by its associated actuator, a full meshing of the gears will occur without a clashing of the gears.

The delay in energizing the drive coupling clutch 125 is obtained through the operation of the valve 270. The valve 270 comprises a valve body 276 having a fluid inlet passage 277 formed therein, the supply line 271 being connected to the outer opening thereof. A vertical passage 278 is formed in the valve body 276 and is adapted to communicate with the horizontal fluid inlet passage 277 via an orifice or opening 279 formed in the wall of the passage 277. Axially movable in the passage 278 is a needle 281, the point of which is disposed to enter the orifice 279 for the purpose of varying the effective opening thereof. A piston 282 is integrally formed on the body of the needle 281 and is adapted to reciprocate within the passage 278. Above the piston 282, the passage 278 is enlarged to form an opening 283 having an internal thread which is adapted to threadedly receive an externally threaded adjusting plug 284. An axial bore 285 is formed in the adjusting plug 284 and receives the outwardly extending end 286 of the needle 281. A snap ring 287 is engaged in a suitable annular groove formed in the periphery of the outer extending end of the needle 281. With this arrangement, the relationship between the needle 281 and the adjusting plug 284 is maintained in predetermined relationship.

The effective opening of the orifice 279 can be varied by axially moving the needle in one direction or another to adjust the relationship between the point of the needle 281 and the wall of the orifice 279. Axial adjustment of the needle 281 is effected by rotating the adjusting plug 284 in one direction or the other to either thread the plug deeper into the opening 283 or to move the plug outwardly of the opening 283. An inward movement of the plug 284 will cause the point of the needle 281 to penetrate deeper into the orifice 279 to lessen the effective opening thereof. On the other hand, an outward adjusting movement of the plug 284 will operate to move the needle 281 axially outwardly of the passage 278 withdrawing the point of the needle out of the orifice to thereby increase the open area.

The pressure fluid flowing into the passage 277 from the supply line 271 will flow through the orifice 279 and into a chamber 290 formed below the piston 282. To maintain the needle 281 in its predetermined adjusted position with respect to the orifice, so that the volume of fluid permitted to flow through the orifice will be limited to a desired flow, a plurality of calibrated springs 288 are operatively disposed between the adjacent inner surfaces of the adjusting plug 284 and the piston 282. With this arrangement, only a predetermined volume of the fluid supplied to the passage 277 is permitted to flow through the preset orifice 279. The regulated volume of pressure fluid flowing into the chamber 290 will flow into a communicating passage 291 formed in the valve body 276. The flow of pressure fluid will flow through the passage 291 and into the connected line 272 and be directed thereby into the expansible chamber (not shown) of the clutch 125. The limited volume of fluid supplied to the clutch 125 will effect a gradual build-up of pressure in the clutch. Under this condition, the coupling engagement between the clutch body 127 and the sleeve 123 is delayed and coupling engagement will not occur until full pressure is developed in the actuator (not shown) in the clutch body. This predetermined delay in the operation of the clutch 125 will allow sufficient time for the shifter actuators 185 to 188, inclusive, to operate to effect a gear shift movement while the transmission is not being driven. When the pressure in the chamber 290 reaches a predetermined value as determined by the calibrated springs 288, the needle 281 will be moved upwardly to open the orifice 279 to its fullest extent so that the flow of fluid to the clutch 125 is no longer restricted. Thus, full pressure from the inlet passage 277 without any restriction will be supplied to the clutch 125 to insure full clutch torque and the clutch will now operate to transmit the input drive from the motor 45 to the transmission shaft 121.

As previously mentioned, when the selector valve 53 is operated for selecting a different feed rate, the flow of pressure fluid into the common supply line 226 is interrupted. As a result, the supply of pressure fluid to the clutch 125 will be interrupted. On this occurence, the pressure in the actuator (not shown) of the clutch will drop below the minimum required to maintain the actuator energized. Under this condition, an internal clutch release mechanism (not shown) will operate to disengage the sleeve 123 from the clutch body 127 thereby interrupting the drive input from the motor 45 to the transmission shaft 121. As the internal clutch release mechanism (not shown) operates to release the clutch, the fluid in the clutch actuator (not shown) will be exhausted therefrom and will attempt to flow out of the valve 270 through the orifice 279. However, at this time there is no pressure in the chamber 290 and the needle 281 is urged to its maximum orifice restricting position by the springs 288. Under this condition, a back pressure will build up in the clutch actuator (not shown) which would tend to prevent the clutch release mechanism (not shown) from operating the clutch in a releasing movement. To prevent the build up of back pressure, the valve 270 has been provided with an orifice by-pass. As shown in FIG. 4, the by-pass arrangement comprises a passage 296 which has an opening 297 constructed at its blind end which communicates with the passage 291. The passage 296 is constructed so that it communicates with the inner end of the fluid inlet passage 277. With this arrangement and with the needle 281 urged into its maximum restricting position, the exhaust fluid from the clutch actuator (not shown) will flow through the line 272, the passage 291, thence through the opening 297 into the passage 277.

The by-pass arrangement must be closed during this time that pressure fluid is being supplied to the valve 270. This is accomplished by providing a ball 298 in the passage 296 which is urged into sealing registry with the opening 297 by operation of a spring 299. The ball and spring arrangement are maintained in operative position within the passage 296 by means of a plug 300 that is threadedly engaged in the outer end of the passage 296. With this arrangement, the spring 299 may be relatively light so that it exerts a minimum bias on the ball 298. This is possible for the reason that when pressure fluid is supplied to the passage 277 it will also flow into the passage 296 and exert a force upon the ball 298 to maintain the ball in sealing registry with the opening 297. On the other hand, when the supply of pressure fluid to the passage 277 of the valve 270 is interrupted, the ball is maintained in registry with the opening 297 only by the relatively light force that is exerted on it by the spring 299. The ball 298 will be unseated by the fluid which is exhausted from the clutch actuator (not shown) when the clutch 125 is operated in a releasing movement.

The hydraulic circuit provided for effecting gear shifting is shown schematically in FIG. 4. As shown, the pump 75 is operated by power obtained from the transmission motor 45. The pump 75 is connected to draw fluid from the reservoir 245 via a connecting line 301. From the pump 75, pressure fluid is pumped into the supply line 244 and directed to the inlet port 302 of the selector valve 53. The hydraulic circuit is provided with the usual pressure relief valve 303 which is connected to the supply line 244 by a branch line 304 and to the reservoir 245 via a return line 305. Pressure fluid supplied to the inlet port 302 of the selector valve 53 is directed into an annular groove 306 formed in the periphery of the stationary sleeve 243. From the groove 306, pressure fluid flows via a communicating radial passage 307 into the passage 251 of the rotary sleeve 242 and thence into the chamber 252. From the chamber 252, the pressure fluid will flow into the common supply line 226 that has one end connected to an outlet port 308 of the valve and the opposite end connected to the lines 226A to 226D inclusive. This distribution is accomplished through communicating passages 309, 311 and an annular groove 312 formed in the periphery of the stationary sleeve 243. On the other hand, pressure fluid from the chamber 252 is directed selectively to the large diameter pistons of the actuators 185 to 188, inclusive, via the individual lines 227 to 230, respectively, by the operation of the valve.

Pressure fluid in the supply line 244 is also directed to the inlet port 316 of a control valve 317 via an interconnecting line 318. The control valve 317 is selectively operable to direct pressure fluid either to the feed rate clutch 62 or to the rapid traverse clutch 70 for effecting the selective energization thereof. The valve 317 comprises a valve body 319 in which a valve spool 320 is slidably disposed for selecive movement, either leftwardly or rightwardly, from a central neutral position. Selective movement of the valve spool 320 is effected by operation of a manual lever 321 which is operatively connected to effect valve spool movement. Rightward movement of the lever 321 about a pivot 322, as viewed in FIG. 4, or upward movement as viewed in FIGURE 1, will effect a leftward movement of the spool from the central neutral position it occupies in FIG. 4. In a leftward position, the valves pool operates to direct pressure fluid from the inlet port 316 to the rapid traverse clutch 70. At this time, the feed rate clutch 62 is connected to an exhaust line 323. The rapid traverse clutch 70 will be maintained energized so long as the lever 321 is maintained in a rightward position. When the lever 321 is released, a spring 324 operatively disposed in the valve body 319 and which was compressed upon the leftward positioning movement of the spool, will operate to return the spool to its central neutral position. With the valve spool in its central neutral position, the rapid traverse clutch and the feed clutch are both deenergized and connected to the exhaust line 323. To energize the feed clutch 62, the lever lever 321 is moved leftwardly, as viewed in FIG. 4, or downwardly, as viewed in FIGURE 1, from its centered position in which it is illustrated. The leftward movement of the lever 321 will operate to move the valve spool 320 from its central neutral position into a rightward position within the valve body 319. With the valve spool in a rightward position it operates to direct pressure fluid to the feed clutch 62 to energize the clutch. Simultaneously therewith, the rapid traverse clutch 70 is connected to the exhaust return line 323. To effect deenergization of the feed clutch 62 it is necessary to manually move the lever from its leftward position to its central position wherein the spool 320 is returned to central neutral position.

From the foregoing explanation, it is apparent that there has been provided an improved transmission control mechanism for a machine tool which insures a smooth shifting of the transmission without gear clashing and which is automatically operable to establish a drive connection from the input source to the transmission after gear shifting has been accomplished.

Although the illustrative embodiment of the invention has been described in considerable detail for the purpose of disclosing a practical operative structure whereby the invention may be practiced advantageously, it is to be understood that the particular apparatus described is intended to be illustrative only, and that the various novel characteristics of the invention may be incorporated in other structural forms without departing from the spirit and scope of the invention as defined in the sub-joined claims.

The principles of this invention having now been fully explained in connection with the foregoing description, I hereby claim as my invention:

1. In a variable output transmission for a machine tool having a plurality of non-shiftable gearing and a plurality of intermeshing shiftable gearing positionable to a plurality of predetermined positional patterns;
   shifting means for shifting said shiftable gearing;
   power means for actuating said shifting means in response to selective adjustment of a control member;
   an input drive connectible to said transmission;
   connecting means operable when actuated to effect a drive connection between said input and said transmission;
   second power means for actuating said connecting means; and,
   a regulating device connected to automatically control the operation of said second power means to delay the actuation of said connection means during the operation of said shifting means to permit said shifting means to shift said shiftable gearing into the selected predetermined positional pattern as selected by the positional adjustment of the control member.

2. A transmission including a train of gearing coordinated for receiving an input and deriving a particular output comprising a plurality of non-shiftable gearing and a plurality of shiftable gearing having a normal drive position and a second drive position;
   a source of power for supplying an input drive to said tranmission;
   a disengageable clutch member normally operable to connect said source of power to said transmission;
   an actuator for each of said shiftable gearing to move said shiftable gearing between the normal drive position and the second drive position when activated, said actuators when deactivated being operable to return an associated shiftable gearing to its normal drive position;
   means continuously urging said actuators to a first position to thereby maintain the associated shiftable gearing in normal driving position;
   a second means selectively operable to supply a force to said actuators to activate said actuators for shifting the respective associated shiftable gearing to their second drive position; and,
   third means responisve to operation of said second means to effect disengagement of said clutch member during the period that said second means is being operated in a selecting operation.

3. In a machine tool having a variable output transmission comprising a plurality of non-shiftable gearing and a plurality of shiftable gearing;
   a positionable control member having a plurality of output selecting positions;
   means for shifting said shiftable gearing to a selected one of a plurality of predetermined positionable patterns in response to the setting of said control member to a corresponding one of a plurality of output selecting positions;
   a motor for imparting an input drive to said transmission;
   connecting means for drivingly connecting said motor to said transmission, said connecting means being operable to interrupt the drive input from said motor to said transmission;

means responsive to the positioning movement of said control member to disengage said connecting means to interrupt the input drive from said motor to said transmission as said control member is being moved to an output selecting position, said disengaging means being further operable when said control member is in a desired output selecting position to reactivate said connecting means after a predetermined time delay to allow said shifting means to operate for moving selected shiftable gearing into the selected predetermined pattern before reconnecting said source of input drive to said transmission to thereby facilitate the intermeshing of said gearing.

4. In a machine tool having a movable member;

a variable output transmission connected to move the movable member at a selected output rate, said transmission having a plurality of non-shiftable gearing and a plurality of shiftable gearing positionable to one of two drive positions;

an input drive;

a clutch member interposed between said input and said transmission and operable when actuated to effect a drive connection therebetween;

hydraulic actuators for shifting said shiftable gearing;

a source of hydraulic pressure;

an output selector control valve interposed between said hydraulic pressure source and said actuators and said clutch member, said selector valve having a plurality of output selecting positions corresponding to the number of outputs of said transmission, said selector valve being operable when adjusted in an output selecting positioning movement to block the flow of hydraulic pressure to said actuators and to said clutch member in a manner that said actuators are immobilized and said clutch is deactuated to thereby disconnect said source of input drive from said transmission; and, a delay control valve interposed between said selector control valve and said clutch and operable to regulate the flow of hydraulic pressure to said clutch to delay the actuation of said clutch a predetermined time to insure operation of the selected actuators to establish a shiftable gear pattern that will provide a transmission output corresponding to the output selected by said selector valve.

5. A transmission including a train of gearing coordinated for receiving an input and deriving a particular output, said transmission having a plurality of non-shiftable gearing and a plurality of shiftable gearing, said shiftable gearing being movable between a normal first drive position and a second drive position;

means biasing all of said shiftable gearing to normal first drive position;

actuators for each shiftable gearing to individually move each shiftable gearing to its shifted second drive position when actuated and when deactivated allowing said gearing to return to its normal first position under the influence of said biasing means;

selectively operable means associated with each of said actuators to supply a force thereto to shift its associated shiftable gearing and actively maintain it in shifted position during the period of its operation;

an input drive;

disengageable connecting means normally engaged to connect said input drive to said transmission; and, means responsive to the actuation of said selectively operable means in a selection movement to effect a disengaging operation of said connecting means to thereby interrupt the drive connection between said input drive and said transmission, said responsive means operating when said selectively operable means is in a selection position to effect the operation of said connecting means to thereby reestablish the connection between said input drive and said transmission.

6. A selectively variable transmission including a series of coordinated change gearing of different ratios;

means constantly biasing said change gearing to a first position wherein an input applied to said transmission will travel through each of said gearing to derive a normal intrinsic output;

actuators individual to each of said change gearing adapted to be activated for shifting its associated gearing against said biasing means to a second position to establish a different ratio on said series to vary said intrinsic output of said transmission;

an input drive;

connecting means normally operable when activated to connect said source of input drive to said transmission, said connecting means operating when deactivated to disconnect said source of input drive from said transmission;

a control means selectively operable to individually actuate said actuators singularly or in desired combinations to establish a desired change ratio for deriving a desired transmission output;

a source of power;

means individual to each actuator to connect said source of power thereto when said control means has been selectively operated in an output selecting movement; and, a second control means responsive to the selective operation of said first control means to deactivate said connecting means thereby disconnecting said source of input drive from said transmission during the operation of said actuators.

References Cited

UNITED STATES PATENTS

| | | | |
|---|---|---|---|
| 2,525,428 | 10/1950 | Schoepe | 192—3.5 |
| 2,943,719 | 7/1960 | McNamara et al. | 74—346 |
| 3,176,529 | 4/1965 | Osburn et al. | 74—364 |
| 2,388,088 | 10/1945 | Sanford et al. | 192—3.5 |
| 2,928,290 | 3/1960 | Hosea et al. | 74—339 |
| 2,955,691 | 10/1960 | Brueder | 192—3.5 |
| 3,058,373 | 10/1962 | Snoy, et al. | |

FRED C. MATTERN, Jr., *Primary Examiner.*

DONLEY J. STOCKING, *Examiner.*

H. S. LAYTON, *Assistant Examiner.*